United States Patent Office 3,417,247
Patented Dec. 17, 1968

3,417,247
RADIANT ENERGY INTENSITY MEASUREMENT SYSTEM
James E. Webb, Administrator of the National Aeronautics and Space Administration with respect to an invention of Edgar S. Davis, La Canada, Calif.
Filed June 29, 1966, Ser. No. 562,445
6 Claims. (Cl. 250—203)

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to a radiant energy intensity measurement system, and more particularly to improvements therein.

In attitude control systems as well as in navigational systems which operate by locating and tracking a particular star, one of the pieces of information used for these operations is the intensity of illumination from the particular star which is being scanned. It is known that other celestial light sources in the field of scan can cause errors in the reading of the particular star intensity. These errors are called noise. The presently favored "peak detecting" systems used for measuring the intensity of illumination from a star are not very effective at eliminating noise.

An object of this invention is to provide a star intensity signal measuring system which minimizes the effects of noise.

Another object of the present invention is to provide a unique star light intensity measuring system which has a lower background sensitivity and a lower stray light sensitivity than previous systems.

Still another object of the present invention is the provision of a novel and unique star light intensity measuring system.

These and other objects of the present invention are achieved by adding circuitry to that already provided upon the guided vehicle for determining the roll error of the vehicle. The roll error detecting circuitry normally includes an image dissector camera tube wherein the optical image of the field viewed by the tube, including the star of concern, is deflected past a slit aperture, using a triangular sweep. The output signal of the image dissector tube is amplified, then applied to a demodulator where it is demodulated using the triangular sweep signal as the second input, then filtered and applied to an output amplifier. This invention utilizes the amplified output signal and applies it to a demodulator having as its second input a first harmonic reference signal which is derived from the triangular sweep signal. The output of the demodulator is then filtered through a low pass filter, and then added to the filtered output from the roll error signal channel. The sum signal represents an average intensity of the star regardless of its location within the area scanned by the aperture.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
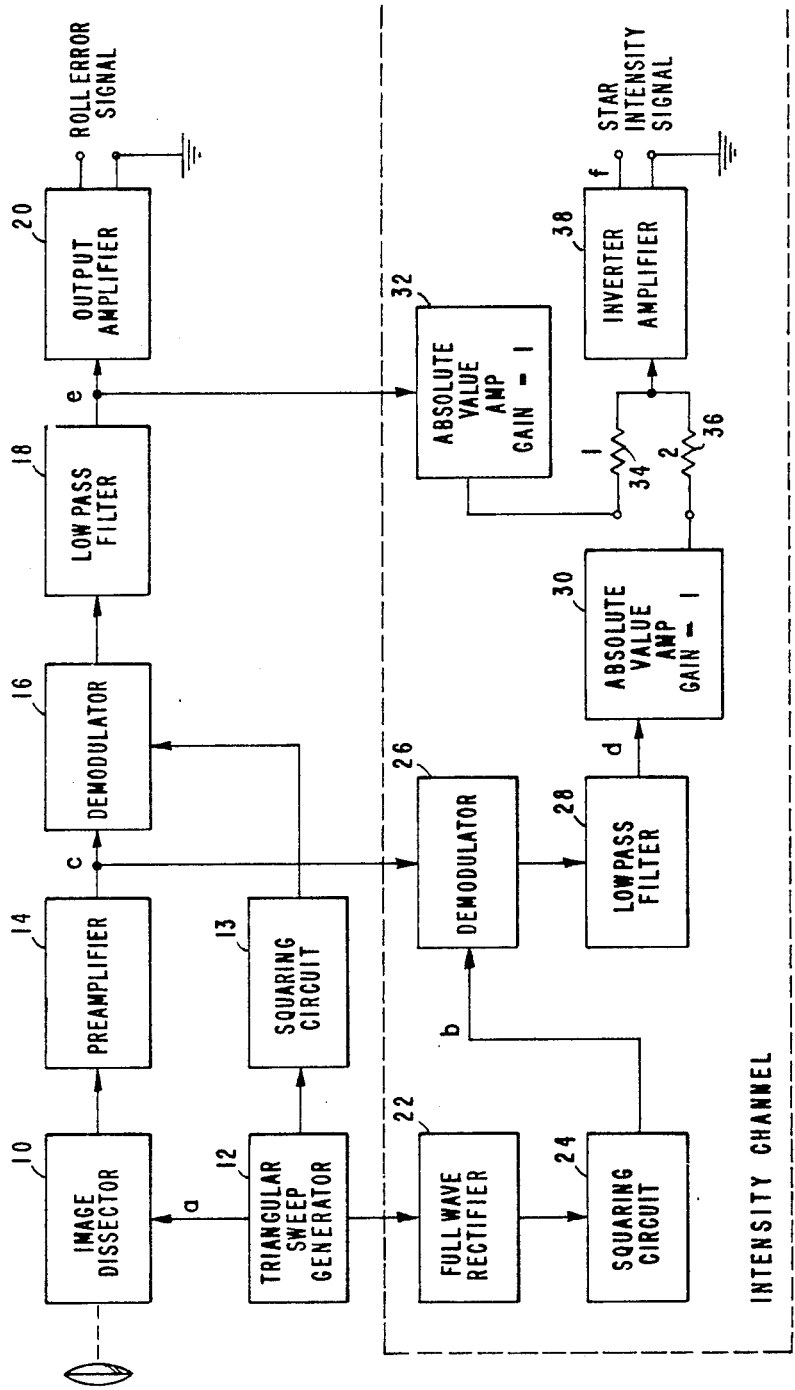
FIGURE 1 is a block schematic diagram of an embodiment of the invention.

Referring now to FIGURE 1, there may be seen a block diagram of an embodiment of the invention. This includes an image dissector camera tube 10 which is used to scan the sky only along a single axis. To achieve thus, a slit aperature is employed instead of the usual opening found in television type image dissector camera tubes. In order to sweep the field of view containing the desired star across the slit aperture, the triangular sweep generator 12 is employed, which applies its output to the image dissector. The output of the image dissector is applied to the preamplifier 14. The output of the preamplifier is applied to a first demodulator 16. The output from the triangular sweep generator is applied to a squaring circuit 13. The output from the squaring circuit 13 is applied as a second input to the first demodulator 13. The output from the first demodulator is applied to a low pass filter 18. The low pass filter output is applied to an output amplifier 20, the output signal of which comprises the star position error signal. As thus far described, the apparatus is known and has been used for the purpose indicated.

In accordance with this invention, output from the triangular sweep generator 12 is used to generate a first harmonic reference signal. This comprises a square wave signal which is at twice the frequency of the triangular sweep generator. Thus, since normally the triangular sweep generator signal is at a 1000 Hz, the first harmonic reference signal has a frequency of 2000 Hz. This is achieved by applying the output of the triangular sweep generator 12 to a full wave rectifier 22, that produces as its output a triangular waveshape at twice the frequency of the triangular sweep generator 12. The output of the full wave rectifier 22 is applied to a square wave generator 24, whose output comprises the first harmonic reference signals of the proper phase which have been described.

The output of the preamplifier 14 is applied to a second demodulator 26 whose other input is the output of the squaring circuit 24. This second demodulator 26 may be called the bisynchronous demodulator. Its output is applied to a low pass filter 28, the output of which is applied to an absolute value amplifier 30. The output of low pass filter 18 is also applied to an absolute value amplifier 32. The amplifiers 30 and 32 provide unity gain and effectively operate as isolation amplifiers. Their outputs are applied to a summing network comprising the two resistors 34, 36 which have one of their ends connected to the respective amplifiers 30, 32 and the other ends joined together. The output of the summing network is applied to an inverter amplifier 38. The output of the inverter amplifier 38 comprises the average intensity of the star as it is scanned across the area scanned by the slit aperture of the image dissector.

Figure 2:
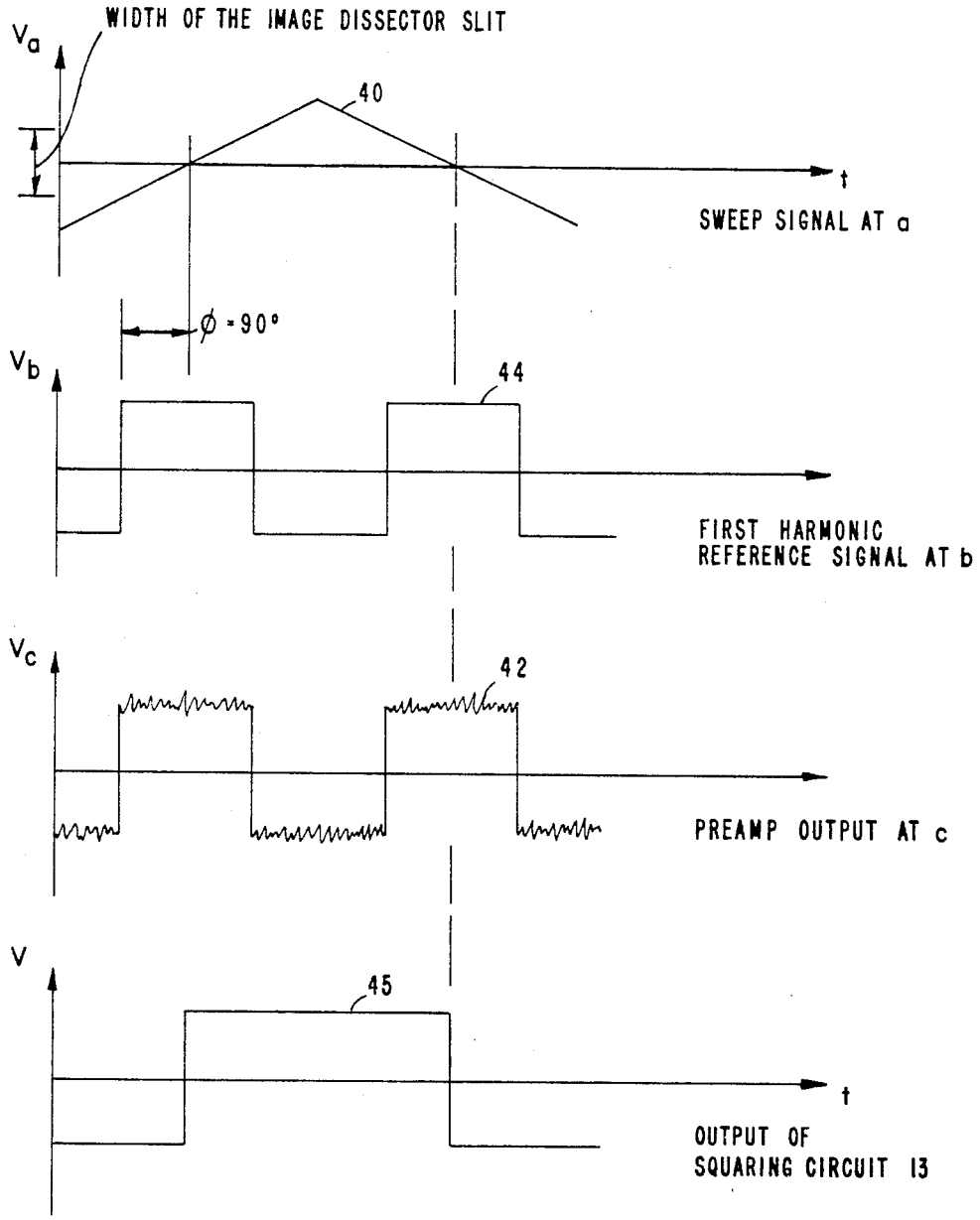
FIGURE 2 illustrates waveshapes which occur at various locations throughout the operation of the system.

Considering now the four waveshapes shown in FIGURE 2, the first waveshape 40 is a representation of the triangular sweep generator output at point a in FIGURE 1. The width of the image dissector slit is represented by the disance between the two spaced lines along the ordinate. The ordinate designated $V_a$ is the amplitude of the voltage of the triangular sweep waveshape 40 which varies with time in the manner shown. When the sweep voltage is zero the star, if on axis, is positioned right in the center of the slit and thus provides its maximum light output. The variations of the output signal of the image dissector, as the electron image is being swept across the aperture is represented by the waveshape 42, which occurs at point c in FIGURE 1, which is at the output of the preamplifier 14. It will be seen that as the optical image of the star being scanned comes into the aperture there is a sharp increase in the output of the preamplifier which substantially maintains its level across the width of the aperture and when the image reaches the other side of the aperture there is a sharp drop in the output signal of the preamplifier.

The first harmonic reference signal 44 which occurs at point b of FIGURE 1, which is the output of the squaring circuit 24, occurs at twice the frequency of the triangular sweep signal and is effectively shifted 90° relative thereto. This signal, as can be seen from the waveshapes, is in phase with the preamplifier output at a. The output of squaring circuit 13 is represented by the waveshape 45.

Figure 3:
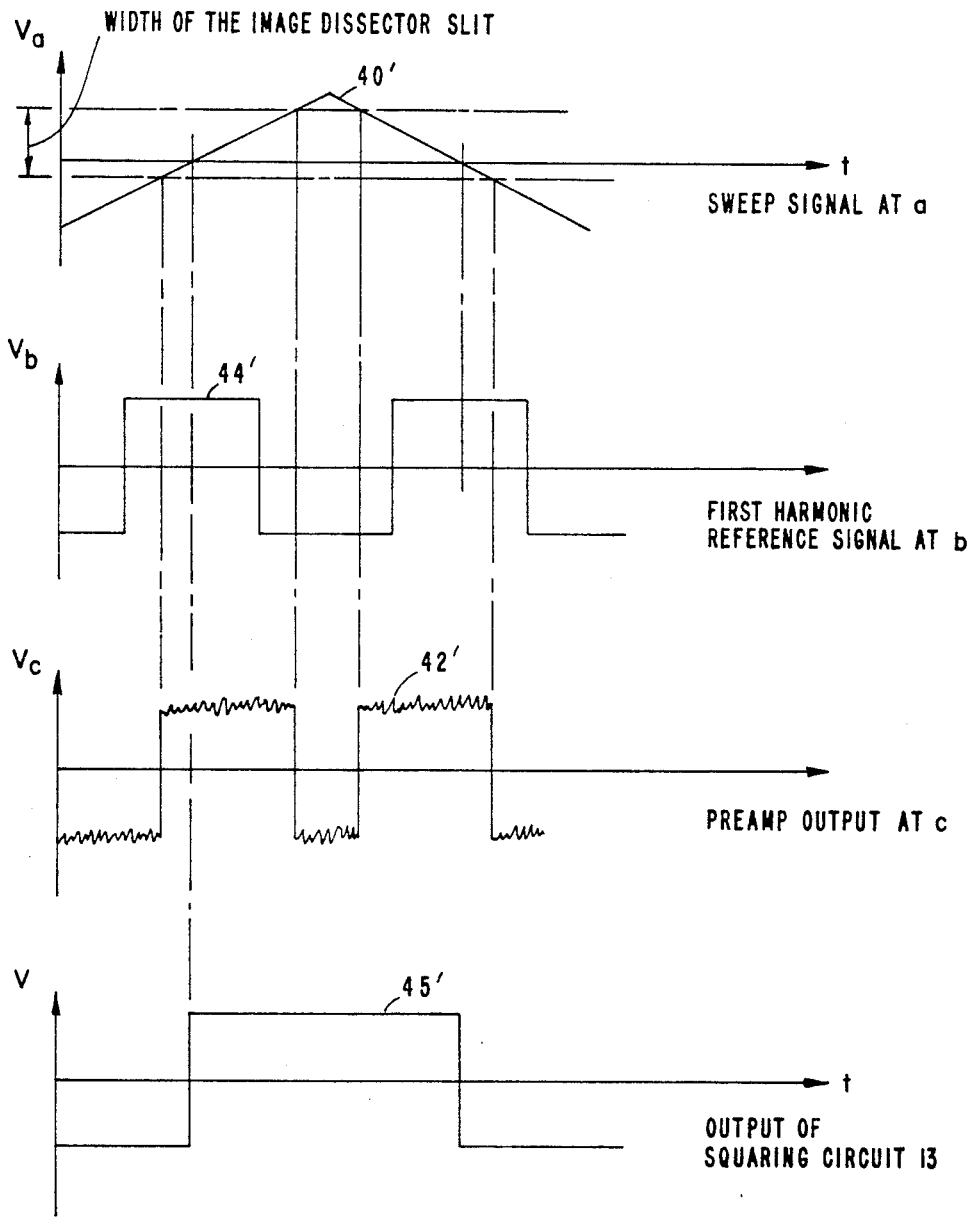
FIGURE 3 shows typical waveshapes obtained at the same locations as those for which waveshapes are shown in FIGURE 2, however this time the star which is being scanned is off the sensor optical axis.

FIGURE 3 shows the same waveshapes as are shown in FIGURE 2, for a star which is off of null by an angle corresponding to ¼ of the peak sweep. The respective waveshapes are given the reference numerals 40′, 44′, 42′ and 45′. The indication that the star is off of null is shown by the shift in the position of the two lines representing the width of the image dissector slit. These are shifted so that these two lines are no longer symmetrical about the axis of the abscissa. While the sweep signal and first harmonic reference signal remain the same, the preamplifier ouput is shifted relative to these two signals. Since a phase sensitive demodulator 16 is employed, the demodulation of the signal 42′ using the signal 41′ produces at the output of the low pass filter 18 a DC signal which is proportional to the magnitude and polarity of the deviation of the star from the optical axis of the sensor in one axis.

Figure 4A:
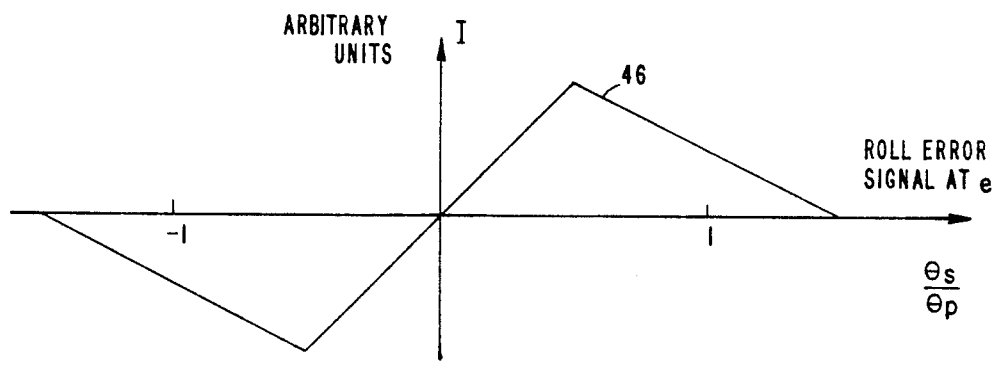
FIGURE 4 illustrates the DC average value of the respective demodulator output signals as a function of star location in the scanned field of view which are observed at the outputs of low pass filters 18 and 28.
Figure 4B:
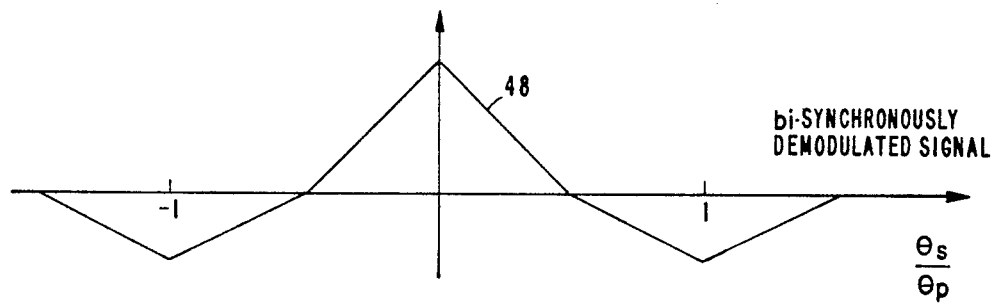

FIGURE 4 shows the respective waveshapes 46 and 48 which represent the signals seen at points d and e in FIGURE 1 which are located at the outputs of the respective low pass filters 28 and 18. The waveshape 46 shows the variation of the voltage output at the low pass filter with the position $\theta_s$ of the star in the field of view. If $\theta_p$ represents the amplitude of the peak sweep, then $\theta_s/\theta_p$ is the normalized star position. The waveshape 48 shows the variation in output voltage at point d with the position of the star in the field of view. The abscissa is $\theta_s/\theta_p$, or the normalized star position.

Figure 5:
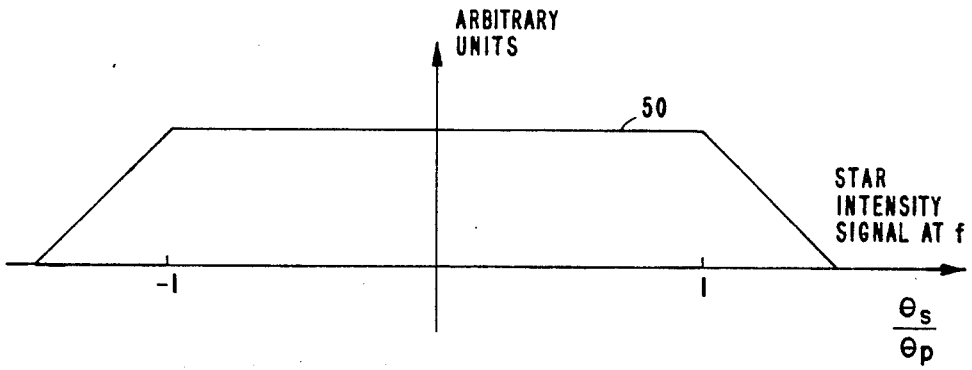
FIGURE 5 is the waveshape of a typical star intensity signal obtained at the output of the apparatus.

FIGURE 5 shows a waveshape 50 which represents the sum of the absolute values of waveshapes 46 and 48. This waveshape 50 is representative of the output signal or star intensity signal over the field of view. This signal is exactly equal to the average value of the signal out of the preamplifier, independent of the position of the star within the field of view. Even more important, the noise bandwith of this signal is determined by the simple low pass filter. Since the noise has a zero average, it does not modify the intensity voltage. Accordingly, a given star produces the same average voltage output at the output of the amplifier 38, independent of the background brightness around the star. As a result, the present invention overcomes the major fault of the conventional peak detector apparatus for measuring star intensity. The peak detector detects the peak of not only the star in the field of view but also of the noise, thus producing an incorrect signal indication.

There has been accordingly described and shown herein a novel and useful arrangement for obtaining a signal representative of the average intensity of a light source which is scanned by an image dissector or other modulator-detector arrangement camera having a silt aperture, regardless of the position of the light source within the field of view scanned. It will be appreciated that despite the fact that the description herein has been made with respect to guided vehicles using stars for guidance, this arrangement is not to be restricted thereto but can find application in other areas where this type of an operation is required.

What is claimed is:

1. In apparatus wherein a source of light in a field is viewed by an image dissector camera wherein the electron image of the field of view is deflected past a slit aperture onto a target by a triangular sweep signal, means for producing a signal representative of the average intensity of said source of illumination regardless of its position within the said scanned field of view, said means comprising first and second demodulators, means for applying the output from said image dissector camera to said first and second demodulators, means for generating a first harmonic reference signal responsive to said triangular sweep signal, means for applying said triangular sweep signal to said first demodulator, means for applying said first harmonic reference signal to said second demodulator, and summing network means for adding the outputs of said first and second demodulators to provide a signal representative of the average intensity of the source of illumination regardless of its position within said scanned field of view.

2. In apparatus as recited in claim 1 wherein said means for generating a first harmonic reference signal generates a signal at twice the frequency of said triangular sweep signal having a rectangular waveshape and phase shifted 90° from said triangular sweep signal.

3. Apparatus as recited in claim 1 wherein there is included a first and second low pass filter, means coupling said first low pass filter between said first demodulator and said summing network means, and means for connecting said second low pass filter between said second demodulator and said summing network means.

4. Apparatus as recited in claim 3 wherein said apparatus includes a preamplifier having an input connected to the output of said image dissector camera and its output connected to one input to said first and second demodulators, and there are first and second absolute value amplifiers respectively connected between the output of the first low pass filter and said summing network means and between the output of said second low pass filter and said summing network means.

5. Apparatus as recited in claim 1 wherein said means for generating a first harmonic reference signal responsive to said triangular sweep signals includes full wave rectifier means having an input to which said triangular sweep signals are applied, square wave generator means having an input to which an output from said full wave rectifier means is applied, and means for applying the output of said square wave generator means to said second demodulator.

6. Apparatus for generating a signal representative of the average intensity of a source of illumination comprising an image dissector camera having a slit aperture, said image dissector camera scanning a field of view including said source of illumination, triangular sweep generator means for generating a triangular sweep signal at a predetermined frequency, means for applying the output of said triangular sweep generator to said image dissector camera for passing an image of said field of view including said source of illumination repetitively by said slit aperture, means for deriving an output signal from said image dissector camera having an amplitude representative of the illumination of the image which passes through said slit aperture, means for generating a first harmonic reference signal responsive to said triangular sweep signal generator output, said first harmonic reference signal having a frequency which is twice that of said first harmonic sweep generator frequency and having a substantially rectangular wave shape, a first and second demodulator each having first and second inputs and an output, means for applying the output signal from said image dissector camera to the respective first inputs of said first and second demodulators, means for applying output from said triangular sweep generator to said first demodulator second input, means for applying output from said first harmonic reference generator to said second demodulator second input, first and second low pass filter means, means for applying the output of said first demodulator to the first low pass filter means, means for applying the output of the second demodulator to the second low pass filter means, means for adding the outputs of said first and second low pass filter means to provide an output signal whose value is representative of the average value of the intensity of said source of illumination regardless of its location within the aperture slit.

References Cited

UNITED STATES PATENTS

| | | | |
|---|---|---|---|
| 3,043,907 | 7/1962 | W. L. Martin | 178—6.8 |
| 3,043,907 | 7/1962 | Martin | 178—6.8 |
| 3,134,022 | 5/1964 | Jones et al. | 250—203 |

JAMES W. LAWRENCE, *Primary Examiner.*

R. F. HOSSFELD, *Assistant Examiner.*

U.S. Cl. X.R.

250—206, 234